Sept. 5, 1967  R. P. BERGESON  3,339,423
DRIVE SYSTEM USEFUL IN A LAUNDRY APPARATUS
Filed Aug. 17, 1965  4 Sheets-Sheet 1

INVENTOR
RICHARD P. BERGESON
BY
William G. Landwier
AGENT

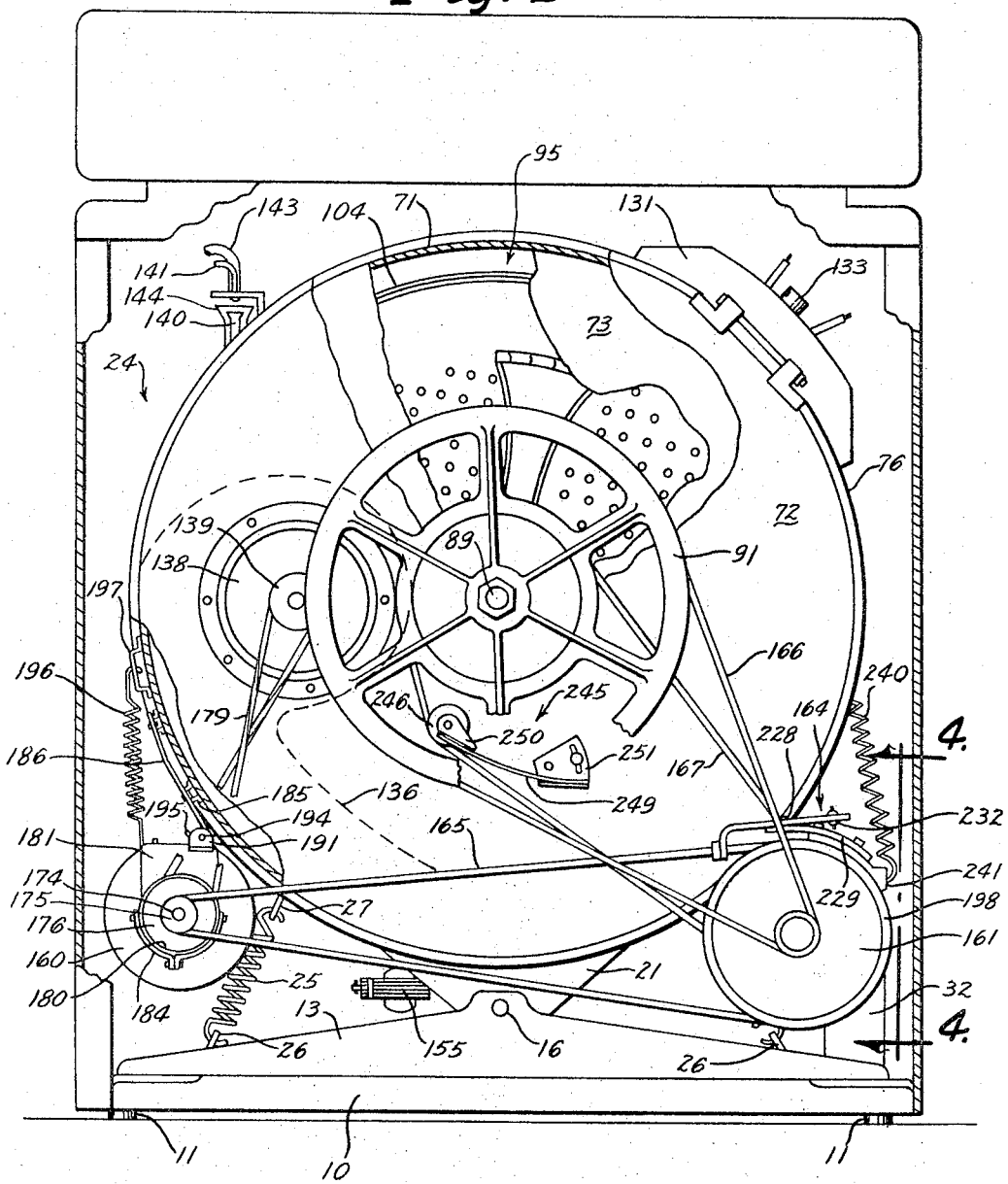

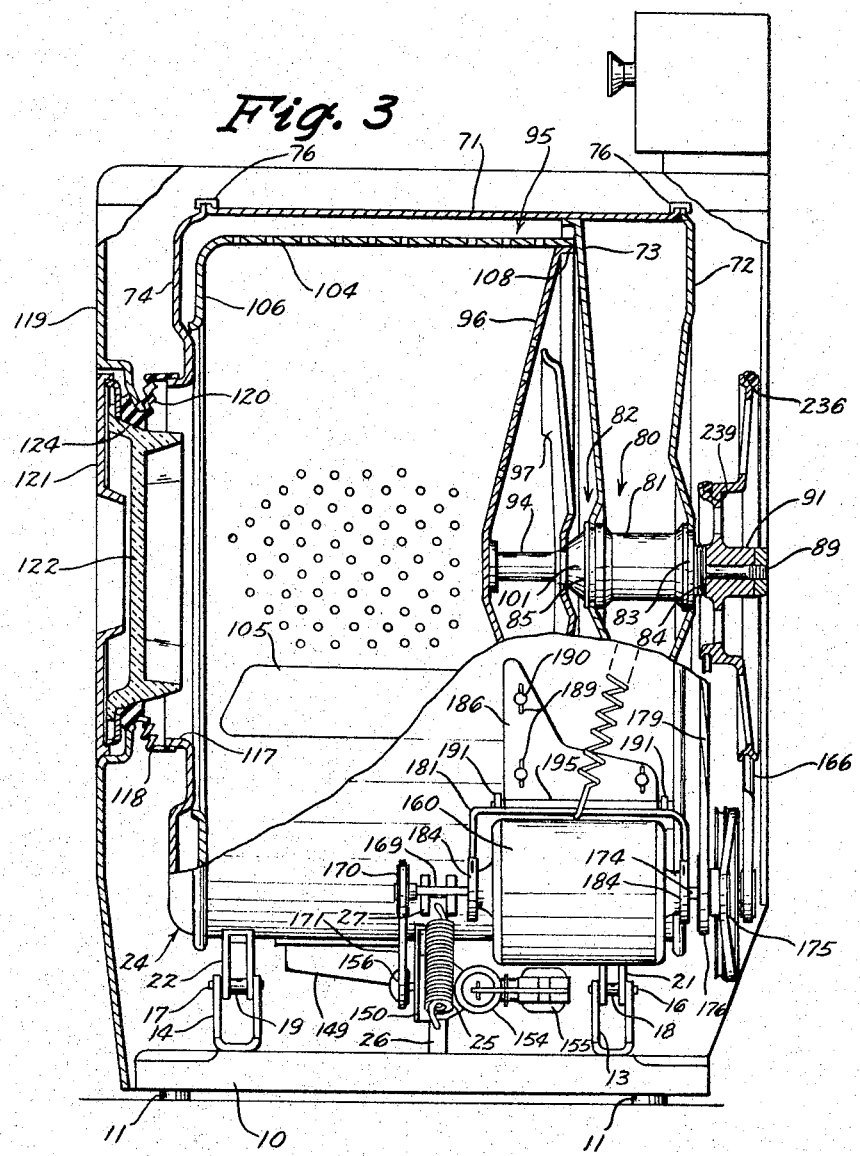

Sept. 5, 1967 R. P. BERGESON 3,339,423
DRIVE SYSTEM USEFUL IN A LAUNDRY APPARATUS
Filed Aug. 17, 1965 4 Sheets-Sheet 4
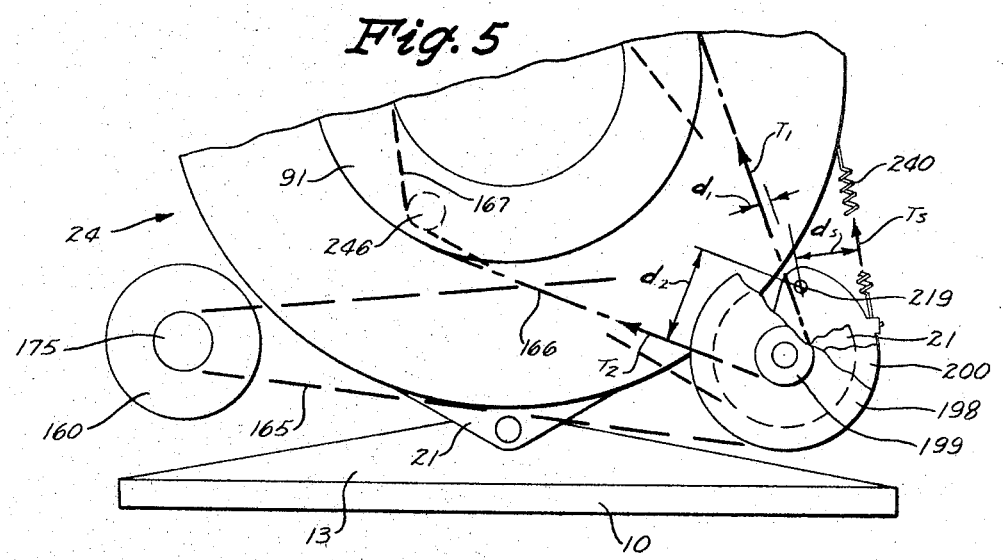
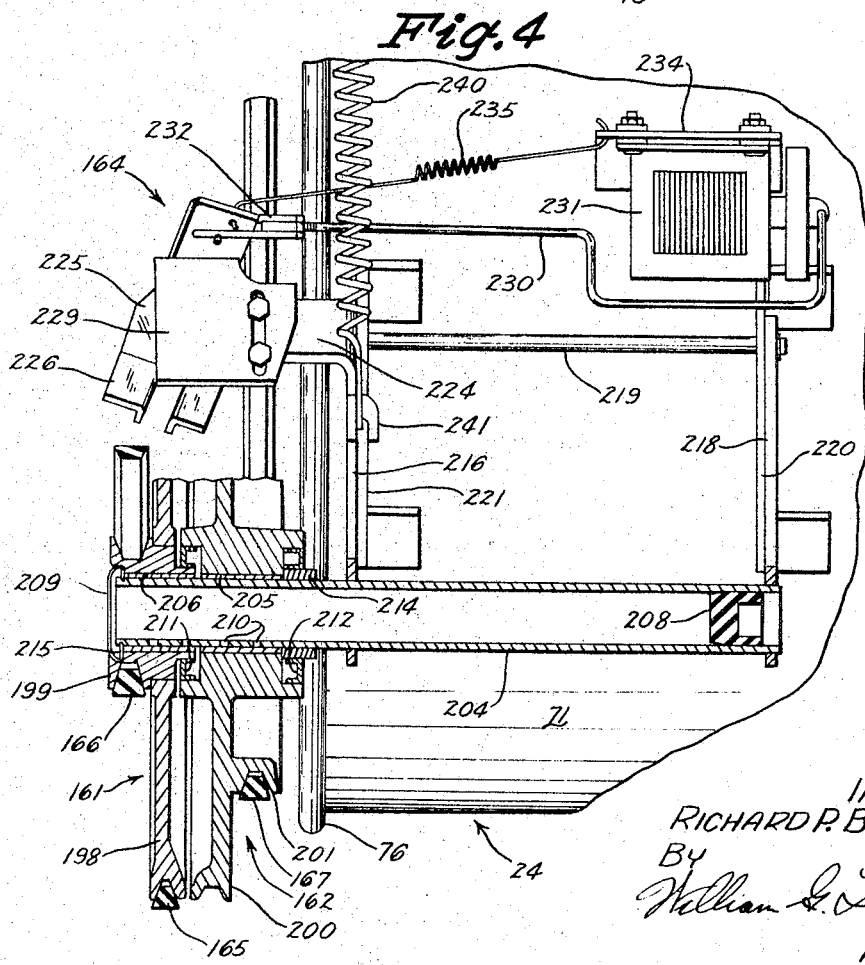
INVENTOR
RICHARD P. BERGESON
BY
William G. Landwier
AGENT

3,339,423
DRIVE SYSTEM USEFUL IN A LAUNDRY APPARATUS
Richard P. Bergeson, Newton, Iowa, assignor to The Maytag Company, Newton, Iowa, a corporation of Delaware
Filed Aug. 17, 1965, Ser. No. 480,298
15 Claims. (Cl. 74—217)

This invention relates to a belt drive transmission and specifically to a system for controlling a rotatable mass by providing means for achieving different rates of torque transmission through a belt drive system which, more specifically, is useful in a laundry apparatus for effecting acceleration and controlled deceleration of a rotatable mass, such as a revoluble fabric container.

There are occassions when it is desirable to be able to achieve different rates of torque transmission for controlling acceleration or deceleration of a rotatable mass. In a laundry apparatus, for example, it is essential that sufficient torque be transmitted to the revoluble fabric container for achieving acceleration. Furthermore, it is well known that a rotating mass possesses an inertia force maintaining the mass rotating even after the driving force is removed. In the case of a laundry apparatus, this continued rotation is an undesirable characteristic since a rotating fabric container presents a safety hazard to the operator if rotation continues after the door or access is opened. Some types of laundry apparatus employ a door lock to prevent access while the container is rotating, but it is nevertheless desirable to achieve a controlled deceleration to stop the rotation of the container as rapidly as conveniently possible following removal of the driving force. It is at the same time, however, desirable or perhaps necessary to prevent an immediate or instantaneous deceleration of the rotating container because of the excessive vibrations of the laundry apparatus resulting from severe torque reactions being transmitted to the support for the laundry apparatus.

A variety of clutch devices have been used to achieve varying rates of torque transmission and to thereby achieve the desired controlled acceleration and deceleration of the fabric container. These clutch devices tend to be expensive and somewhat complicated and thus are not fully acceptable for use on household laundry equipment.

It is therefore an object of the present invention to provide an improved belt drive transmission operable for effecting different rates of torque transmission.

It is a further object of the present invention to provide an improved system for effecting controlled deceleration of a rotating member.

It is a further object of the present invention to provide an improved system for effecting controlled deceleration of a rotating member following the removal of the driving force at a rate of deceleration which substantially eliminates severe torque reactions.

It is a further object of the present invention to provide a belt drive transmission operable for achieving controlled acceleration and deceleration to thereby eliminate the need for auxiliary clutches or other auxiliary torque limiting means.

It is a further object of the present invention to provide improved means for mounting and biasing a belt drive system to achieve belt tensions operable for effecting controlled acceleration and deceleration of a rotatable mass.

It is a further object of the present invention to provide means for effecting drive belt slippage responsive to the sudden application of an inertia load on a belt drive system.

It is still a further object of the present invention to provide means responsive to de-energization of a driving means and the resulting application of an inertia load to the rotating member for preventing severe torque reactions and over-speeding of the drive motor in a shifting belt drive system.

It is yet a further object of the present invention to provide an improved system including pivotally operable mounting means for maintaining the proper tension on a belt transmission for effecting acceleration of a rotatable member while allowing slippage of said belt transmission to achieve controlled deceleration of the rotating member.

The present invention achieves the above objects in a belt drive system having an electric motor which is drivingly connected to a revoluble fabric container by a pair of selectively engageable drive paths. The motor is connected by first belt means with one of a pair of adjacently mounted, relatively rotatable, pulleys. Each of these pulleys is in turn connected through speed reduction and belt means with the revoluble fabric container. Selectively energizable means is operable for shifting said first belt between the pair of adjacent pulleys to select one of the pair of alternate drive paths. Means are provided for tensioning the drive belts by a system which includes pivotally mounting the motor means and the shaft carrying the pair of relatively rotatable pulleys. The pulley-supporting shaft member is mounted for pivotal action about a specifically located pivot point and biased to provide proper belt tension for effecting a first rate of torque transmission during acceleration of the rotatable member while being operable for effecting a second rate of torque transmission and allowing slippage of one of said drive belts responsive to deenergization of the motor means or upon shifting of the drive system from its higher output speed to a lower output speed. This belt slippage allows continued rotation of the inertia-driven rotatable member but at a decreasing rate to achieve a controlled deceleration thereof without severe torque reactions.

Operation of the device and further objects and advantages thereof will become evident as the description proceeds and from an examination of the accompanying drawings which illustrate a preferred embodiment of the invention and in which similar numerals refer to similar parts throughout the several views, wherein:

FIGURE 2 is a rear view of the combination washer-drier of FIGURE 1 with the cabinet back removed for showing the drive system of the present invention;

FIGURE 3 is one side view showing a portion of the drive system of the present invention and further including a fragmentary section showing the drum and hub structure of the combination washer-drier;

FIGURE 4 is an enlarged fragmentary view showing the belt shifting means for the drive system of the instant invention as indicated by lines 4—4 in FIGURE 2; and FIGURE 5 is a diagrammatic view of the drive system of the invention.

Figure 1:
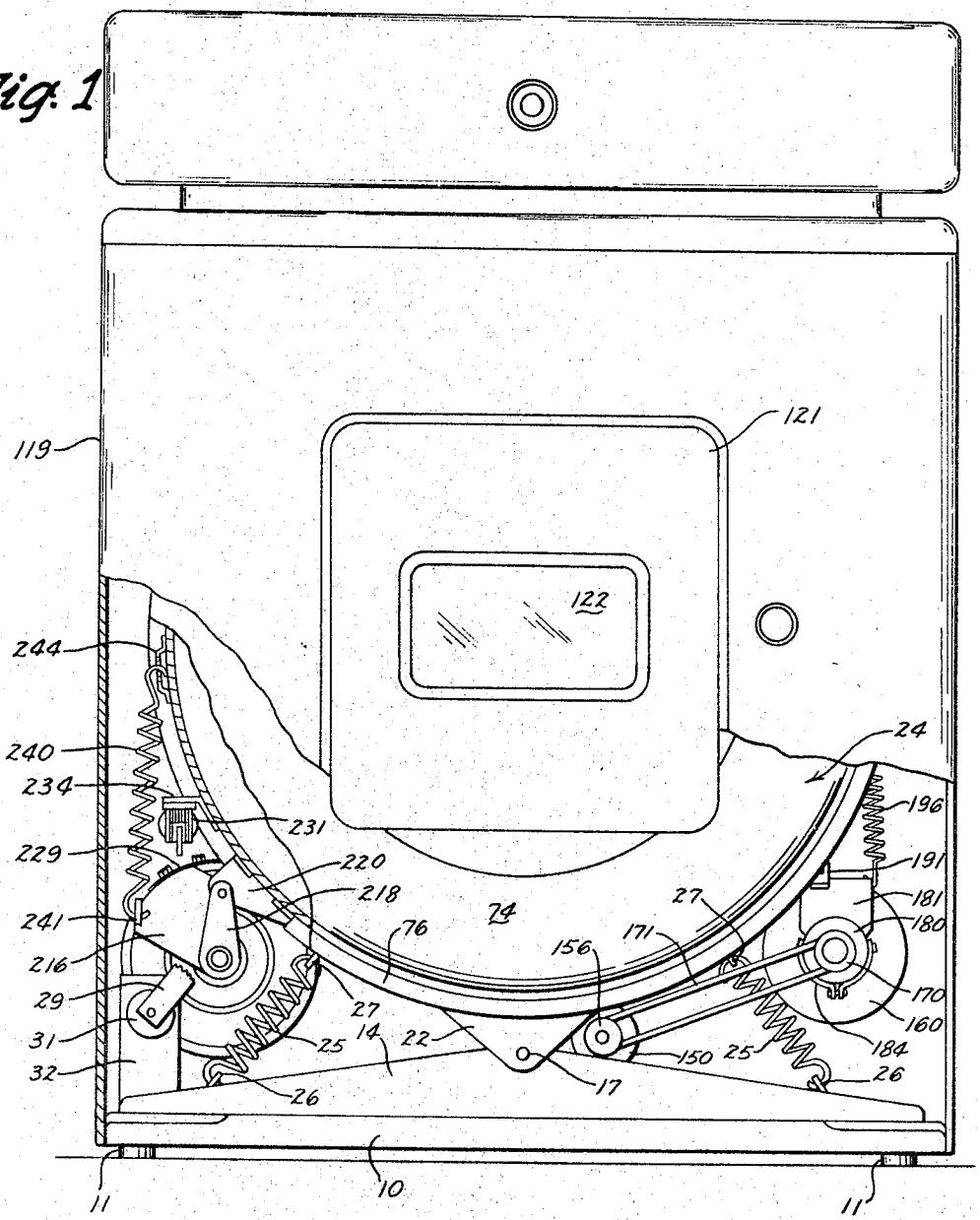
FIGURE 1 is a front view of a combination washer-drier having a lower portion of the cabinet removed to expose the tub supporting means and a portion of the drive system.

Referring now to the accompanying drawings in detail, it will be seen that the combination washer-drier unit shown in these drawings and comprising an embodiment of the instant invention includes a substantially flat surfaced base frame 10 mounted on legs 11. Mounted upon base frame 10 are a pair of support members 13 and 14 which are welded, or securely affixed in some suitable manner, to the base frame 10 to form the two major supports for the washer-drier unit illustrated in the accompanying figures.

As apparent from an inspection of FIGURES 1 through 3, support members 13 and 14 have a channel cross section and a substantially triangular elevational configuration with the apex of these members receiving pivot pins 16 and 17. Pivot pins 16 and 17 are journalled in the bearing sleeves 18 and 19 and form a two-point support for the tub brackets 21 and 22, respectively. This allows the tube or casing, generally indicated by the arrow 24, and fastened to brackets 21 and 22, to oscillate back and forth on pins 16 and 17 in an arcuate movement in response to various forces generated within tub 24.

Tub 24 is normally maintained in an upright position on pins 16 and 17 by the two centering springs 25, each connected between base 10 and tub 24 by the spring anchor brackets 26 and 27 fastened to the base 10 and tub 24, respectively. Damper bracket (not shown) is attached to tub 24 to form the support for the damper leaf spring 29, shown partially in FIGURE 1. Damper pad 31 is carried in a ball and socket joint at the end of damper spring 29. Base frame 10 is provided with an upstanding damper plate 32 frictionally engaged by the damper pad 31. The energy imparted to tub 24 causes a tub 24 to oscillate on the supporting pivot pins 16 and 17 so that the energy is absorbed and dissipated by the relatively movable, frictionally engaged, damper pad 31 and damper plate 32.

Tub or casing 24 includes a generally cylindrical side wall 71, a pair of spaced rear walls 72 and 73, and a front wall 74. The front and outer rear walls 74 and 72, respectively, are connected to cylindrical side wall 71 by means of the encompassing flanged hoop-like members 76 while the partition wall 73 positioned between walls 72 and 74 is secured, as by welding, to side wall 71.

It will be seen from an inspection of FIGURE 3 that the spaced rear walls 72 and 73 support the tub bearing assembly, generally indicated by the reference numeral 80. The bearing assembly 80 includes a spacer hub 81 located between and abutting the rear walls 72 and 73, and a tubular clamp member 82 located concentrically within hub 81. Clamp member 82 is formed with a shoulder 85 at one end thereof and has a threaded portion 84 at the other end thereof for receiving clamp nut 83 which, when tightened on member 82, produces a rigid support with respect to tub 24 for two bearings (not shown), with one located adjacent each of walls 72 and 73 within hub 81 for supporting drive shaft 89.

The rear end of drive shaft 89 is rigidly connected to the large drive pulley 91 whereas its front end is threaded into hub 94 of the fabric container 95. Container 95 includes a perforate rear wall 96 rigidly affixed to and cooperating with spider-like member 97 to form a double cone support connected to the hub 94 for providing a rigid support for the fabric container 95 on drive shaft 89. A sealing member 101 is biased against the rear surface of this revoluble hub structure 94 to prevent water in tub 24 from entering bearing assembly 80. As apparent from FIGURE 3, container 95 also includes a perforate cylindrical side wall 104 carrying clothes elevating vanes 105. Side wall 104 merges into the short front wall 106 and joins flanged rear wall 96 in an overlapping relationship to form a protruding flange 108 spaced from wall 73 and cooperable with wall 73 to form an effective air barrier for preventing the short circuiting of heated air around the rear peripheral edge of container 95.

Front wall 74 of tub 24 also includes a circular loading opening 117 encircled by one end of the bellows seal 118. This seal in turn has its opposite end fastened to a similar opening formed in the cabinet 119. Sealing member 118 includes a number of convolutions 120 permitting movement of tub 24 relative to cabinet 119. A rectangular door 121 hinged on cabinet 119 carries a transparent glass window 122 having a cylindrical portion extending rearwardly through the bellows seal 118 for peripheral engagement with a flexible annular sealing lip 124. This arrangement effectively seals the unit against fluid leakage while enabling the operator of the machine to observe operations taking place within tub 24 during the washing and drying processes.

Tub 24 also includes a heater housing 131 formed separately or as a part of the tub wall 71 and supporting and enclosing a heating element (not shown) capable of radiating heat energy into tub 24 through an opening located in the cylindrical tub wall 71. Heater housing 131 also mounts a thermostat 133 connected in series with the heater.

A combination blower-condenser unit capable of moving air through tub 24, scrubbing lint from this air, and condensing moisture from hot vapors formed within tub 24 during the drying operation, is positioned within the compartment formed by and between portions of the spaced walls 72 and 73. The compartment for the blower-condenser unit is produced by cooperation of walls 72 and 73 with an imperforate scroll-shaped side wall 136, shown by dotted lines in FIGURE 3, and bridging the space between walls 72 and 73, to enclose the vapor condenser and blower unit.

Water for the condensing operation is directed onto the impeller which, though not shown, is positioned behind plate 138 and is driven by blower pulley 139. Plate 138 is bolted to the rear wall 72 of tub 24 and provides convenient access to the blower housing. The action of the rotating impeller upon the stream of water produces a cool mist, spray, or fog for condensing out moisture from hot vapors entering the blower-condenser unit during the drying operation. Water for the vapor condensing process is supplied through the external conduit 141 and is directed through an inlet 140 and into the blower-condenser compartment by a conduit (not shown) connected between the cylindrical side wall 71 and the scroll-shaped wall member 136. Vapor laden air is moved from the interior of tub 24, by the action of the impeller, through the blower-condenser compartment for the vapor condensing process before being directed again toward the heater compartment or vented to the atmosphere.

More specific details of construction of this blower-condenser unit, and also of the aforementioned bearing assembly 80, may be found in U.S. Patent 2,986,917 issued to T. R. Smith on June 6, 1961 and assigned to the assignee of the instant application.

Water for the washing operation is supplied through conduit 143 and is directed through inlet 144 into the interior of tub 24. Conduits 141 and 143 are connected to a water valve (not shown).

Referring now to FIGURE 3, tub 24 includes a lower recessed portion in the form of a sump 149 communicating with the drain pump 150. Sump 149 receives the washing fluids from casing 24 and also receives, from the blower-condenser compartment, the condensing fluid and the condensate and lint removed from the air entering the blower-condenser unit. The fluids and lint entering sump 149 are discharged through pump 150 to an external drain (not shown). A valve 154, controlled by solenoid 155, is positioned between pump 150 and the external drain to control the periods of time fluids are discharged to the external drain. Pump 150 is driven during washing operations by a pulley at 156; however, solenoid 155 is de-energized during the washing operations to maintain valve 154 closed and fluids within the tub 24.

Power to rotate container 95 is supplied by a drive system including a two-speed motor 160, a pair of alternate speed reduction pulley assemblies indicated generally by arrows 161 and 162, belt shifting means 164, and power transmission means including belts 165, 166, and 167. As will be more fully explained hereinafter, this drive system is operable for providing a plurality of speeds of rotation of the container 95 so as to achieve an optimum fabric treatment cycle. Specifically, this drive system is operable for providing a relatively slow tumble speed for accomplishing the washing action, a distribution speed for effecting arrangement of the fabrics in a substantially even pattern around the inner periphery of the container and becoming plastered thereto, an intermediate extraction speed for removing excess fluids and a relatively high speed spin for accomplishing fluid extraction.

Two-speed motor 160 includes a four-pole winding and a six-pole winding for operation of motor 160 at 1725 and 1150 r.p.m., respectively. The motor is further identified as a split-phase, unidirectional, fractional-horsepower motor of the type commonly used on laundry appliances.

As best shown in FIGURE 3, motor 160 is provided with shaft extensions at both ends for driving a plurality of components included in the combination washer-drier of the instant invention. Shaft extension 169 extending from the left end of motor 160, as viewed in FIGURE 4, supports a pulley 170 drivingly coupled by belt 171 to pulley 156 for driving pump 150. Pump 150 will therefore be driven during each period of operation of motor 160 but will be operative for pumping fluid from tub 24 only during those periods when solenoid 155 is energized for opening valve 154.

Belt 171 is a round stretch belt and is formed of a polyurethane material so as to possess the necessary characteristics for adjusting to variations in pulley center distances as will be more fully explained hereinafter.

Shaft extension 174 extending from the right end of motor 160, as viewed in FIGURE 4, carries pulleys 175 and 176 fixedly mounted thereon. As best shown in FIGURE 2, pulley 175 drives belt 165 and is thereby drivingly connected to one of the pair of speed reduction pulley assemblies 161 and 162. Pulley 176 is drivingly engaged by belt 179 which in turn engages blower pulley 139. Belt 179 is assembled between pulleys 176 and 139 in a crossed pattern so as to operate blower impeller (not shown) in a direction opposite to that of motor 160.

Motor 160 is adjustably and pivotally mounted on tub 24 so as to provide for proper tension in belts 179 and 165. As best seen in FIGURES 1, 2 and 3, motor 160 is secured by a mounting ring 180 at each end thereof to an inverted U-shaped bracket 181 with a pair of adjustable clamps 184. U-shaped bracket 181 is formed with a pair of upturned tabs 191 for mounting on adjustable bracket 186. Bracket 186 is provided with a plurality of slots 189 to receive screw members 190 for attaching bracket 186 to brackets 185 which are in turn secured to tub wall 71 as by welding. Means are thereby provided for adjustably supporting motor bracket 186 to allow positioning of motor 160 along an arcuate path.

Motor 160 is supported by pin 194 on flange 195 extending from bracket 186 and is biased in a clockwise direction about pivot pin 194 by a coil spring 196 connected between motor bracket 181 and bracket 197 fixed in turn to the outer wall 71 of tub member 24 as best seen in FIGURE 2. Though not specifically shown, bracket 197 is provided with a plurality of notches to facilitate the proper tensioning of spring 196.

As best seen in FIGURES 2 and 4, and as previously indicated, a speed reduction system is connected to motor 160 through pulley 175 and drive belt 165. The speed reduction system further includes a pair of pulley assemblies 161 and 162. Pulley assembly 161 comprises a large pulley 198 and an attached small pulley 199 and may be considered as the tumble pulley assembly. Spin pulley assembly 162 includes a large pulley 200 and a relatively smaller, integrally attached, pulley 201.

Tumble pulley assembly 161 and spin pulley assembly 162 are adjacently mounted upon a common jackshaft 204 for relative rotation to each other and to jackshaft 204. Large pulley members 198 and 200 are of substantially equal diameter and are closely spaced to facilitate shifting of belt 165 between the drive grooves of the two pulleys.

Pulley assemblies 161 and 162 are rotatively supported upon jackshaft member 204 through the use of bearing members 205 and 206. Tubular jackshaft member 204 is supplied with a plug seal 208 at one end thereof and a seal cap 209 at the other end thereof so as to be useful as a lubricant reservoir. Lubrication is supplied to bearings 205 and 206 through holes 210. Additional seal members 211 and 212 are fitted within or adjacent the hubs of pulley assemblies 161 and 162 to prevent the leakage of lubricants from the area of bearings 205 and 206.

Pulley assemblies 161 and 162 are positioned and retained upon shaft 204 by stop ring 214 and retaining ring 215.

Jackshaft 204 is attached, as by welding, to a pair of supporting arms 216 and 218. These arms are in turn pivotally supported on pivot pin 219. Pivot pin 219 is supported at its extreme ends by a pair of brackets 220 and 221 attached to the exterior side of wall 71 of drum 24 as by welding, for example.

Supporting arm 216 also includes a flange portion 224 for mounting the belt shift means 164 juxtaposed to and positioned above pulley assemblies 161 and 162. Belt shift means 164 includes a shifting lever 225 having a pair of depending legs 226 at one end thereof astride belt 165. Lever 225 is pivotally mounted by pin 228, as best seen in FIGURE 2, on a bracket 229, and thereby adjustably mounted on flange 224 of supporting arm 216.

Connected to the other end of shifting lever 225 is means for operating the shifting means 164 to move belt 165 between pulleys 198 and 200. The operating means includes a shaft member 230, bifurcated yoke member 232, pivotably attached to the end of lever 225, and a selectively energizable solenoid 231. A threaded connection of shaft 230 and yoke 232 provides adjustment for proper positioning of legs 226 relative to the V-grooves of pulleys 198 and 200. Solenoid 231 is attached to a bracket 234, fixed in turn to wall 71 of tub 24. Upon energization of solenoid 231, lever 225 is pivoted about pin 228 to move belt 165 from pulley 198 to pulley 200. A spring 235 returns lever 225 to the position shown in FIGURE 7 for moving belt 165 from pulley 200 to pulley 198 upon de-energization of solenoid 231.

Container drive pulley 91 includes a first V-groove 236 for receiving belt 166 from pulley 199 and a second V-groove 239 for receiving belt 167 from pulley 201. It is therefore seen that a pair of alternate drive paths are established between motor 160 and container 95. The first path is from motor 160 through belt 165 to pulley 198, and through pulley 199 and belt 166 to groove 236 of pulley 91. This drive path provides a relatively high ratio speed reduction and is operable with motor 160 turning at 1725 r.p.m. for driving pulleys 198 and 199 at approximately 360 r.p.m., thereby turning pulley 91 and container 95 at approximately 60 r.p.m.

The second drive path is established from motor 160 through belt 165 to pulley 200, and through pulley 201, belt 167, and groove 239 of pulley 91 to container 95. This drive path is operable for driving container 95 at approximately 300 r.p.m. with pulleys 200 and 201 rotating at approximately 360 r.p.m. and with belt 165 shifted to the spin position.

Means are included in this belt transmission drive system for maintaining proper tension in each of the belts. The adjustable and pivotable mounting of motor 160 provides means for maintaining proper belt tension in blower belt 179 and drive belt 165. As shown in FIGURE 2, the adjustable feature of bracket 186 provides means for increasing or decreasing the centerline distance between the blower pulley 139 and pulley 176 while effecting relatively little change in the center distance between pulleys 175 and 198 or 200. The adjustable spring biasing feature of the pivotable motor mount provides means for adjusting the biasing of motor 160 around pivot pin 194 to maintain proper belt tension on drive belt 165. It is further noted that changes in the positioning of motor 160 will effect a change in the center distances between pulley 170 and 156 for driving pump 150. For this reason, belt 171 is in the form of a stretch belt to compensate for the variations in center distances.

As previously indicated, the speed reduction pulley assemblies 161, 162 are pivotally supported relative to tub 24 through jackshaft 204, supporting arms 216 and 218 and pivot pin 219. A spring 240 connected between flange 241 of supporting arm 216 at one end and anchor bracket 244, fixed in turn to wall 71 of tub 24, at the other end biases the jackshaft and pulley assemblies in counterclockwise direction about pivot 219, as viewed in FIGURES 2 and 5, for maintaining tension on belt 166.

During the spin operation, belt 165 is shifted to pulley 200 so that container 95 is driven at one of the extraction speeds through belt 167. Proper tension is maintained on belt 167 by idler assembly 245 comprising an idler pulley 246 biased for the engagement and tensioning of belt 167 by a leaf spring 249 attached between idler pulley support arm 250 and bracket 251. The assembly is adjustably mounted on back wall 72 of tub 24 at bracket 251 to provide further tension adjustment. The idler pulley assembly is shown on the slack side of belt 167 in this embodiment; however, it might instead be placed on the tight side.

As previously shown, the speed reduction system is movably mounted relative to drum 24 and, as best shown in FIGURE 5, is pivotable about pin 219 so that spring 240 and idler pulley 246 maintain proper tensions in belts 166 and 167 to insure satisfactory acceleration and deceleration of rotatable container 95 as will be more fully and specifically described hereinafter.

One very essential consideration in this type of a belt shift mechanism is that of torque reactions and the vibrations resulting therefrom following shifting of the belt between pulleys 198 and 200. Upon energization for high speed extraction, the shifting of belt 165 from pulley 198 to pulley 200 results in a slow acceleration toward extraction speed without harmful torque reactions. The shifting of belt 165 from pulley 200 to pulley 198 upon interruption or completion of the spin operation, however, creates a condition which could result in extremely severe torque reactions in the absence of clutch means, belt slippage, or other torque limiting devices.

It is seen that with container 95 rotating at approximately 300 r.p.m., as during an extraction operation, a de-energization of the machine or a de-energization of solenoid 231 to return the container to distribution or tumble speed, will allow the inertia of the rotating mass to effectively establish container 95 as a driving member continuing, at least momentarily, to rotate pulley 91 at approximately 300 r.p.m. As previously shown, pulley 91 is coupled to motor 160 through belts 165 and 166 and reduction pulleys 199 and 198 and thus the rotating container will attempt to rotate motor 160 through this drive path at approximately 9,000 r.p.m. This, of course, is extremely undesirable if not impossible and torque limiting means must be provided to prevent severe torque reactions. This torque control is accomplished in the drive system of the instant invention through the provision for different levels of torque transmission.

The drive system of the instant invention is operable for providing these two levels of torque transmission for achieving acceleration of container 95 to tumble speed by motor 160 and for achieving controlled deceleration from spin while avoiding torque reactions and overspeeding of motor 160.

It may be seen in FIGURE 5 that the location of pivot point 219 and the magnitude of force provided by spring 240 is of major importance and are interdependent upon the summation of moments about the pivot point for effecting the proper belt tension in belt 166 during the acceleration to tumble and deceleration from spin. The specific location of the pivot point 219 is critical and requires consideration of the magnitude of force resulting from spring 240.

Referring to FIGURE 5, and viewing the system, at this time, as being driven by motor 160 through belt 165 and 166 for rotating container 95 at a tumble speed in a clockwise direction, it is seen that $T_1$ represents the tight side of belt 166 during motor driven clockwise acceleration of container 95 and is therefore of greater magnitude than $T_2$. Since $T_2$ represents the slack side of belt 166 during motor driven clockwise acceleration of container 95, it is of relatively low magnitude and thus, with a pivot 219 as located in FIGURE 5, a small spring tension, $T_s$, is sufficient to maintain proper driving tension on belt 166 for accelerating container 95 in a clockwise direction. Thus this invention includes usage of a relatively small spring biasing force during rotation of container 95 at a tumble velocity. This arrangement is advantageous since a relatively low biasing spring tension is easily overcome by the relatively large $T_2$ force encountered upon shifting of the speed system from a high speed condition to a low speed condition. Belt slippage and gradual deceleration of container 95 is thereby effected upon this speed shifting as will be more fully explained hereinafter.

Referring again to FIGURE 5, but now considering container 95 as an inertia-driven member driving pulley 91 in a clockwise direction, for example, following the shifting of belt 165 to pulley 198 from a high speed drive condition to a low speed drive condition. The tensions in the legs of belt 166 and the biasing spring 240 are shown as force arrows in FIGURE 5 and designated as $T_1$, $T_2$, and $T_s$, as previously indicated. The moment arms of these forces tending to pivot the pulley assemblies about pivot pin 219 are shown as $d_1$, $d_2$, and $d_s$, respectively. Consideration of the other forces acting on jackshaft 204, such as the weight of the pivotable jackshaft and pulley assembly and the belt tensions in belts 165 and 167, may be omitted in the following comparative explanation. The moments of these omitted forces are relatively small either because the weight or tension is small or because the moment arm of the force about the pivot point is small. These forces are therefore not shown in FIGURE 5. These other forces must, however, be considered in a complete and detailed analysis of summation of moments and must be compensated for by adjustments in spring 240.

Taking the summation of moments about pivot pin 219, as shown in FIGURE 5, gives the following: $T_1 d_1$ plus $T_2 d_2 = T_s d_s$. Since container 95 is now driving through belt 166 in a clockwise direction, the tension, $T_2$, will be the tight side, or leg, of belt 166. Thus it is seen that both $T_1$ and $d_1$ are small and that $T_2$ greatly exceeds $T_1$. Upon the shifting of belt 165 to a slow speed drive condition, previously free wheeling belt 166 is momentarily loaded dynamically so that the magnitude of $T_2$ increases and the moment $T_2 d_2$ greatly exceeds $T_s d_s$. The jackshaft 204 and supporting arms 216 and 218 are thus pivoted in a clockwise direction about pivot pin 219 to decrease the centerline distance between pulleys 91 and 199 and allow $T_1$ to approach zero tension and allow $T_2 d_2$ to become approximately equal to $T_s d_s$. With $T_1$ having approximately zero tension, pulley 199 will slip relative to belt 166. The friction between pulley 199 and belt 166 will, however, act as a brake and gradually decelerate container 95 from the spin speed. In addition, belt 165 may slip relative to pulley 175 and some overspeeding of motor 160 may occur but the amount of overspeed will not be harmful to the motor and will not be of such magnitude as to cause excessive vibrations in the machine.

The required relationship and interdependency of belt tensions, spring tension, and moment arms may more clearly be shown in an analysis of a specific example of a preferred embodiment of the system described in this application.

As previously indicated, this invention provides a drive system operable for achieving two different rates of torque transmission. In a preferred embodiment this system is useful for achieving acceleration to a relatively low tumble speed and for achieving a controlled deceleration from a relatively high spin speed. In this preferred embodiment, clockwise acceleration by the motor represents the first condition, or rate, of torque transmission. The second condition of torque transmission, as during deceleration from a clockwise rotation of an inertia driven drum, will be similar to that during counterclockwise acceleration by the motor since it may be seen that the relative belt tensions would be similar. It might also be stated in the form of a mathematical proportion that the relative belt tensions $T_1$, $T_2$ during clockwise motor driven acceleration are to the belt tensions during counterclockwise motor driven acceleration as the belt tensions during clockwise motor driven acceleration to tumble are to the belt tensions during clockwise deceleration from the high inertia driven spin speed.

It is to be further noted that this example isolates the system from the effects of belts 165 and 167 and from the weight of the pivotable jackshaft and pulley assembly and considers only the tensions in belt 166 and spring 240. As previously discussed, the other omitted forces may be compensated for by varying the tension in spring 240.

The variables for a specific operable washer-drier combination embodying the instant invention are as follows:

MOMENT ARMS (AT REST)

$d_1 = 0.44$ in.
$d_2 = 4.17$ in.
$d_3 = 3.70$ in.

TENSIONS

|  | At Rest, lb. | Clockwise Acceleration, lb. | Clockwise Deceleration, lb. |
| --- | --- | --- | --- |
| $T_1$ | 21.0 | 79.5 | 6.9 |
| $T_2$ | 21.0 | 14.5 | 37.9 |
| $T_s$ | 26.0 | 26.0 | 43.0 |

MOMENTS ABOUT PIVOT 219

|  | At Rest, in.-lb. | Clockwise Acceleration, in.-lb. | Clockwise Deceleration, in.-lb. |
| --- | --- | --- | --- |
| $T_1 d_1$ | 9 | 35 | 154 |
| $T_2 d_2$ | 87 | 61 | 154 |
| $T_s d_3$ | 96 | 96 | 157 |

A consideration of this information, as applied to FIGURE 5, is helpful in understanding the function and advantages of the instant invention. It is noted that a summation of moments about pivot 219 during clockwise acceleration, or acceleration to tumble speed in this embodiment, maintains adequate tension $T_1$ and $T_2$ in belt 166, as indicated above, to effect a high rate of torque transmission. A similar summation of moments about pivot 219 during clockwise deceleration, as previously discussed, reveals that the jackshaft and pulley asesembly has been pivoted to reduce the belt tension $T_1$ to such a low level that only a much lower rate of torque transmission is effected. This lower rate of torque transmission is useful in the preferred embodiment of the instant invention for achieving a controlled deceleration of the inertia driven container 95.

The above specific drive system is effective for achieving acceleration from rest to tumble speed in less than one-fourth second and achieving controlled deceleration from spin speed to rest in approximately two seconds.

An example of an *improper* location of pivot point 219 in a similarly arranged belt shifting drive system which would result in non-slippage of the drive belt means and a severe torque reaction may be assumed by viewing FIGURE 5 and establishing the direction of rotation of container 95 in a counterclockwise direction. This reversal of directions of rotation while maintaining the same pivot point is equivalent to changing the location of the pivot point and maintaining the same direction of rotation. The reversal in the assumed direction of rotation creates the situation in which the high tension side of the belt, during deceleration from a spin speed passes substantially through the pivot point rather than the low tension or slack side of the belt as shown previously when container 95 was assumed rotating in a clockwise direction. Under the previously indicated clockwise rotation, $T_2$ was the tight side and $T_1$ was the slack side during deceleration; however, under conditions of container 95 rotating in a counterclockwise direction, $T_1$ will be the tight side whereas $T_2$ will be the slack side. Under this newly assumed condition of counterclockwise rotation, $T_s$ will be substantially greater than the relatively low tension $T_2$ in the slack side. Therefore, spring 240 will tend to pivot jackshaft 204 and bracket 216, 218 in a counterclockwise direction about pivot pin 219 and will thereby increase tension $T_2$ and prevent belt slippage.

Under these conditions of non-slippage of belt 166, the rotating container 95 will attempt to rotate motor 160 at a speed of approximately 9,000 r.p.m. which, of course, is impossible. This condition will result in severe torque reactions causing extreme vibrations of the laundry appliance.

It is thus seen that the rate or degree of belt slippage, and therefore the rate of deceleration of an inertia driven member as in the instant embodiment, is dependent upon a number of variables including location of the pivot and spring tension and also belt wrap, and belt coefficient of friction. These may be varied in the design stages to give the desired balance between the two different rates of torque transmission or between acceleration to tumble speed and deceleration from spin speed. In addition, the adjustability of spring 240 provides means for varying the relative rates in a particular machine. It is possible to increase tension in spring 240 so as to achieve less belt slippage and thus more rapid deceleration of the inertia driven container but tension must be maintained below the level at which too rapid a deceleration causes severe torque reactions.

The above discussion relating to variations in this drive system indicates, along with further consideration of FIGURE 5, that the mounting of jackshaft 204 and the pulley assemblies may be revised and pivot 219 and spring 240 relocated for pivoting the jackshaft and the pulley assemblies in a clockwise direction about the pivot point if the revisions are accompanied with a change in motor driving direction. All of the above examples and descriptions would be equally applicable to such a revised arrangement of the jackshaft, pulley assemblies, pivot, and spring 240.

The previous description has indicated that four speeds of operation are directly provided by the drive system of the instant invention. Two of these four speeds are relatively slow speeds and may be selectively obtained through the following drive path; motor 160 energized in either its four-pole winding or its six-pole winding, a first speed reduction between pulleys 175 and 198, pulley 199 driven with pulley 198, and a second speed reduction between pulley 199 and V-groove 236 of pulley 91. This drive path is operable for transmitting the torque of motor 160 to container 95 and for reducing the speed from the previously indicated motor speed of 1725 r.p.m. and 1150 r.p.m. to container speeds of 60 r.p.m. and 40 r.p.m., respectively The other two additional speeds are obtainable by selectively energizing solenoid 231 for shifting belt 165 to pulley 200. Motor 160 then drives pulley 200 for driving pulley 91 through pulley 201, and belt 167 to groove 239. Container 95 will be driven approximately 300 r.p.m. with motor 160 operating at 1725 r.p.m. and at 200 r.p.m. with motor 160 operating at 1150 r.p.m.

Still another speed, which in this embodiment is a relatively slow speed for achieving a tumble washing action, is obtained by cylically energizing motor 160 for predetermined periods of time in the four or six-pole windings to obtain a speed of operation relatively slower than that achieved by steady energization on the four-pole winding. This pulsing of motor 160 for predetermined time periods may be controlled to provide a relatively constant speed tumble action but in this embodiment is spaced so as to provide a varying speed tumble action within the speed range of 40 to 60 r.p.m. as is more fully described in U.S. 3,172,277, issued Mar. 9, 1965 to Charles W. Burkland and assigned to the assignee of the instant invention.

Means other than pulsing of motor 160 for obtaining another speed which is relatively close to one of said slower speeds is available. A split, variable pulley with associated shifting means, for example, could also be used. In addition, a double grooved pulley with a belt shift device could be used.

The washer-drier combination unit is controlled by a sequence control mechanism (not shown). The sequence control mechanism is operable for sequentially energizing and de-energizing the electrical components through an electrical circuit to provide a programmed series of operations comprising a washing and drying operation, for example.

The series of operations will include operation of the drive system at a plurality of speeds to provide tumble and extraction operations. There will, therefore, be occasions for shifting the drive system from the high speed condition to the low speed condition, thus requiring a deceleration of the container 95 from the extraction speed. The drive system of the instant invention as previously explained facilitates and achieves this deceleration. In addition, deceleration at the completion of the cycle or upon an intermediate de-energization of the apparatus as by opening the door or upon a power failure is also achieved through operation of the instant invention. The instant invention may also be cooperative with and responsive to an aunbalance control system (not shown) for decelerating the container 95 upon sensing a predetermined condition of unbalance.

In summary, it is seen that the instant application describes a drive system useful in washer-drier combination unit for rotating a fabric container at a plurality of speeds and further being adapted for gradually decelerating or braking the rotation of the container upon de-energization of the motor or shifting solenoid. It is a drive system in which the automatic braking feature is economically provided and one relatively service-free because of the absence of additional mechanical clutches and brakes.

In the drawings and specification, there has been set forth a preferred embodiment of the invention and, although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit or scope of this invention as further defined in the following claims.

I claim:

1. In a drive system useful in a laundry apparatus for controlling rotation of a rotatable container: motive power means; shaft means spaced from said motive power means; rotatable pulley means mounted on said shaft means and including a driven portion and a driving portion; first belt means driven by said motive power means and drivingly connected to said driven portion; drive pulley means rotatively fixed to said rotatable container; second belt means connected between said driving portion and said pulley means; means pivotally mounting said shaft means radially spaced from a predetermined pivot axis; means pivotally biasing said shaft and said shaft-mounted pulley means about said predetermined pivot axis to effect a first rate of torque transmission through said second belt means for acceleration of said rotatable container by said motive power means; and means for effecting a resistance to the coast-down of said rotatable container responsive to interruption of said acceleration, said shaft means and shaft-mounted pulley means being pivotally operable about said pivot axis responsive to said resistance for effecting a second lower rate of torque transmission to control deceleration of said rotatable container.

2. In a drive system useful in a laundry apparatus for controlling rotation of a rotatable container: motor means operable in a first driving condition and a second driving condition; shaft means spaced from said motor means; rotatable pulley means mounted on said shaft means and including a driven portion and a driving portion; first belt means connecting said driven portion to said motor means; drive pulley means rotatively fixed to said rotatable container; second belt means connected between said driving portion and said drive pulley means; means pivotally mounting said shaft means radially spaced from a predetermined pivot axis; means pivotally biasing said shaft and said shaft-mounted pulley means about said pivot axis to effect a first rate of torque transmission through said second belt means with said motor means in said first driving condition for accelerating said rotatable container; and means for effecting said second driving condition of said motor means to interrupt said acceleration, said shaft means and said shaft-mounted pulley means being pivotally operable about said pivot axis for effecting a second lower rate of torque transmission to gradually decelerate said rotatable container responsive to interruption of said first driving condition and initiation of said second driving condition.

3. In a drive system useful in a laundry apparatus for controlling rotation of a rotatable container: motor means for rotating said rotatable container at a first speed and at a lower speed; shaft means spaced from said motor means; rotatable pulley means mounted on said shaft means and including a driven portion and a driving portion; first belt means connecting said driven portion to said motor meas; drive pulley means rotatively fixed to said rotatable container; second belt means connected between said driving portion and said drive pulley means; means pivotally mounting said shaft means radially spaced from a predetermined pivot axis; and means pivotally biasing said shaft means and shaft-mounted pulley means about said pivot axis for effecting a first rate of torque transmission from said motor means to said drive pulley means for rotation of said rotatable container at said first speed, said shaft means and said shaft-mounted pulley means being pivotally operable about said pivot axis to effect a second lower rate of torque transmission from said motor means to said drive pulley means for gradually decelerating said rotatable container from said first speed responsive to interruption of operation at said first speed and initiation of operation at said second speed.

4. In a drive system useful in a laundry apparatus for controlling rotation of a rotatable container: motor means; shaft means spaced from said motor means; rotatable pulley means mounted on said shaft means and including a driven portion and a driving portion; first belt means connecting said driven portion to said motor means; drive pulley means rotatively fixed to said container; second belt means connected between said driving portion and said drive pulley means; means pivotally mounting said shaft means radially spaced from a predetermined pivot axis; means pivotally biasing said shaft means about said pivot axis to effect a first rate of torque transmission through said second belt means for acceleration of said rotatable container to a first speed; means for selectively effecting rotation of said rotatable container at a second higher speed; and means for effecting a resistance to a coast-down of said container from said second higher speed upon interruption of operation at said higher speed, said shaft means being pivotally operable about said pivot axis responsive to said resistance for effecting a second rate of torque transmission through said second belt means to control deceleration of said rotatable container from said second higher speed.

5. In a drive system useful in a laundry apparatus for controlling rotation of a rotatable container: motor means; shaft means spaced from said motor means; rotatable pulley means mounted on said shaft means and including a driven portion and a driving portion; first belt means connecting said driven portion to said motor means; drive pulley means rotatively fixed to said container; second belt means connected between said driving portion and said drive pulley means; means pivotally mounting said shaft means radially spaced from a predetermined pivot axis; means pivotally biasing said shaft means and shaft-mounted pulley means about said pivot axis to effect a first condition of driving tension on said second belt means for acceleration of said rotatable container to a first speed; means for selectively effecting rotation of said rotatable container at a second higher speed; and means for effecting a change in the operation of said drive system including interrupting operation at said second higher speed and initiating deceleration toward said first lower speed, said shaft means being pivotally operable for effecting a second condition of tension on said second belt means to gradually decelerate said rotatable container from said second higher speed responsive to said change in operation of said drive system.

6. In a drive system useful in a laundry apparatus for controlling rotation of a rotatable container: motor means; shaft means spaced from said motor means; rotatable pulley means mounted on said shaft means and including a driven portion and a driving portion; first belt means connecting said driven portion to said motor means; drive pulley means rotatively fixed to said container; second belt means connected between said driving portion and said drive pulley means; means pivotally mounting said shaft means radially spaced from a predeterminad pivot axis; means pivotally biasing said shaft means and shaft-mounted pulley means about said pivot axis to effect a first condition of driving tension on said second belt means for acceleration of said rotatable container to a first speed, said second belt means having a tight side located relatively close to said pivot axis when said second belt means is in said first condition of driving tension; means for selectively effecting rotation of said rotatable container at a second higher speed; and means for effecting a change in the operation of said drive system including interrupting operation at said second higher speed and initiating deceleration toward said first lower speed, said shaft and shaft-mounted pulley means being pivotally operable about said pivot axis for effecting a second condition of driving tension to control deceleration of said rotatable container from said second higher speed responsive to said change in operation.

7. In a drive system useful in a laundry apparatus for controlling rotation of a rotatable container: motor means; shaft means spaced from said motor means; rotatable pulley means mounted on said shaft means and including a driven portion and a driving portion; first belt means connecting said driven portion to said motor means; drive pulley means rotatively fixed to said container; second belt means connected between said driving portion and said drive pulley means; means pivotally mounting said shaft means radially spaced from a predetermined pivot axis; means pivotally biasing said shaft means and shaft-mounted pulley means about said pivot axis to effect a first rate of torque transmission between said motor means and said rotatable container for acceleration of said rotatable container to said first speed; means for selectively effecting rotation of said rotatable container at a second higher speed, and means for shifting said drive system to interrupt operation at said second higher speed and initiating operation at said first lower speed, said shaft means and shaft-mounted pulley means being pivotally operable about said pivot axis for effecting a second lower rate of torque transmission between said rotatable container and said motor means to gradually decelerate said rotatable container from said second higher speed responsive to said operation of the shifting means.

8. In a drive system useful in a laundry apparatus for controlling rotation of a rotatable container: motor means; shaft means spaced from said motor means; rotatable pulley means mounted on said shaft means and including a driven portion and a driving portion; first belt means connecting said driven portion to said motor means; drive pulley means rotatively fixed to said container; second belt means connected between said driving portion and said drive pulley means for rotation of said container at a first speed; means pivotally mounting said shaft means for radially spacing said shaft-mounted pulley means from a predetermined pivot axis; means pivotally biasing said shaft means and shaft-mounted pulley means about said pivot axis to maintain driving tension on said second belt means for effecting a torque transmission through said second belt means and the driving portion of said shaft-mounted pulley means for acceleration of said rotatable container to said first speed; means for selectively effecting rotation of said rotatable container at a second higher speed; and means for effecting a change in the operation of said drive system including interrupting operation at said second higher speed and initiating deceleration toward said first lower speed, said shaft means and shaft-mounted pulley means being pivotally operable about said pivot axis to effect slippage of said second belt means at the driving portion of said shaft-mounted pulley means responsive to said change in operation for gradually decelerating said rotatable container from said second higher speed.

9. In a drive system useful in a laundry apparatus for controlling rotation of a rotatable container: motor means, shaft means spaced from said motor means; rotatable pulley means mounted on said shaft means and including a driven portion and a driving portion; first belt means connecting said driven portion to said motor means; drive pulley means rotatively fixed to said container; a second belt having a first leg and a second leg extending between the driving portion of said shaft-mounted pulley means and said drive pulley means and drivingly engageable therebetween for rotation of said rotatable container at a first speed; means for mounting said shaft means for pivotal movement about a predetermined pivot axis to control tension in said first and second legs of said second belt; means pivotally biasing said shaft means and shaft-mounted pulley means about said pivot axis to effect a first condition of tensions in said first and second legs for acceleration of said rotatable container to said first speed; means for selectively effecting rotation of said rotatable container at a second higher speed; and means for effecting a change in the operation of said drive system including interrupting operation at said second higher speed and initiating deceleration toward said first speed, said shaft means and shaft-mounted pulley means being pivotally operable about said pivot axis for effecting a substantial decrease in the tension in one of said first and second legs to gradually decelerate said rotatable container from said second higher speed responsive to said change in operation.

10. In a drive system useful in a laundry apparatus for controlling rotation of a rotatable container: motor means; shaft means spaced from said motor means; rotatable pulley means mounted on said shaft means and including a driven portion and a driving portion; first belt means connecting said driven portion to said motor means; drive pulley means rotatively fixed to said container; a second belt having a first leg and a second leg extending between the driving portion of said shaft-mounted pulley means and said drive pulley means and drivingly engageable therebetween for rotation of said rotatable container at a first speed; means for mounting said shaft means for pivotal movement about a predetermined pivot axis to control tension in said first and second legs of said second belt; means pivotally biasing said shaft means and shaft-mounted pulley means about said pivot axis to effect a first condition of tensions in said first and second legs for acceleration of said rotatable container to said first speed, said first leg being the tight side and said second leg being the slack side of said second belt during acceleration of said rotatable container to said first speed; means for selectively effecting rotation of said rotatable container at a second higher speed; and means for effecting a change in the operation of said drive system including interrupting operation at said second higher speed and initiating deceleration toward said first speed, said shaft means and said shaft-mounted pulley means being pivotally responsive to said change in operation for effecting a substantial decrease in the tension in said first leg to gradually decelerate said rotatable container from said second higher speed.

11. In a drive system useful in a laundry apparatus for controlling rotation of a rotatable container: motor means; shaft means spaced from said motor means; rotatable pulley means mounted on said shaft means and including a driven portion and a driving portion; first belt means connecting said driven portion to said motor means; drive pulley means rotatively fixed to said container for rotation therewith; output means including a second drive belt having a first leg and a second leg extending between the driving portion of said shaft-mounted pulley means and said drive pulley means and drivingly engageable therebetween for rotation of said rotatable container at a first speed; means for mounting said shaft means for pivotal movement about a predetermined pivot axis to control tension in said first and second legs of said second drive belt, said pivot axis being located so that the moment arm of the tension in said first leg is relatively small and the moment arm of the tension in said second leg is relatively large; means pivotally biasing said shaft means and shaft-mounted pulley means about said pivot axis to effect a first condition of tension in said first and second legs for acceleration of said rotatable container to said first speed, said first leg being the tight side and said second leg being the slack side of said second belt during said acceleration of the rotatable container to said first speed; means for selectively effecting rotation of said rotatable container at a second higher speed; and means for effecting a change in the operation of said drive system including interrupting operation at said second higher speed and initiating operation for said first speed, said shaft means and said shaft-mounted pulley means being pivotally responsive to said change in operation for effecting a substantial decrease in tension in said first leg to gradually decelerate said rotatable container from said second higher speed.

12. In a drive system useful in a laundry apparatus for controlling rotation of a rotatable container: motor means; jackshaft means spaced from said motor means; a pair of relatively rotatable pulley assemblies mounted on said jackshaft means in adjacent belt shifting position; first belt means selectively connecting said motor means with one of said pulley assemblies; first output means associated with the first of said pulley assemblies and including second belt means for rotation of said rotatable container at a first speed; means pivotally mounting said jackshaft means radially spaced from a predetermined pivot axis for controlling tension in said second belt means; and means pivotally biasing said jackshaft means about said pivot axis to effect a first rate of torque transmission between said motor means and said rotatable container means for acceleration toward said first speed; selectively operable means for shifting said first belt means between said pair of pulley assemblies; second output means associated with the second of said pair of pulley assemblies for rotation of said rotatable container at a speed higher than said first speed; said jackshaft means being pivotally operable about said pivot axis to effect a second lower rate of torque transmission between said rotatable container and said motor means for gradually decelerating said rotatable container from said second speed toward said first speed responsive to shifting of said first belt means from said second to said first pulley assembly.

13. In a drive system useful in a laundry apparatus for controlling rotation of a rotatable container; motor means; jackshaft means spaced from said motor means; a pair of relatively rotatable pulley assemblies mounted on said jackshaft means and having driven portions in adjacent belt shifting position; first belt means selectively connecting said motor means with the driven portion of one of said pulley assemblies; first output means including second belt means driven by a first of said pair of pulley assemblies for rotation of said rotatable container at a first speed; and means for pivotally mounting said jackshaft means radially spaced from a pivot axis; means pivotally biasing said jackshaft means about said pivot axis to effect a first rate of torque transmission for acceleration of said rotatable container to said first speed through said first output means; selectively operable means for shifting said first belt means between driven portions of said pair of pulley assemblies; second output means driven by a second of said pair of pulley assemblies for rotation of said rotatable container at a speed higher than said first speed; said jackshaft means being pivotally operable about said pivot axis to effect a second rate of torque transmission for gradually decelerating said rotatable container from said higher speed responsive to a shifting of said first belt means into re-engagement with the driven portion of said first pulley assembly upon interruption of operation of said rotatable container at said higher speed.

14. In a drive system useful in a laundry apparatus for controlling rotation of a rotatable container; motor means; jackshaft means; a pair of relatively rotatable pulley assemblies each having a driven portion mounted on said jackshaft means in adjacent belt shifting position; first belt means selectively connecting said motor means with the driven portion of one of said pulley assemblies; first output means including second belt means driven by a first of said pair of pulley assemblies for rotation of said rotatable container at a first speed; and means for pivotally mounting said jackshaft means radially spaced from a pivot axis and biased about said pivot axis to maintain a first condition of tension on said second belt means during acceleration of said rotatable container to said first speed; selectively operable means for shifting said first belt means between the driven portions of said pair of pulley assemblies; second output means driven by a second of said pair of pulley assemblies for rotation of said rotatable container at a speed higher than said first speed; said jackshaft being pivotable about said pivot axis to effect a relatively large decrease in the belt tension in one side of said second belt means for gradually decelerating said rotatable container responsive to a shifting of said first belt means into re-engagement with the driven portion of the first of said pulley assemblies upon interruption of operation of said rotatable container at said higher speed.

15. In a drive system useful in a laundry apparatus for controlling rotation of a rotatable container: motor means; jackshaft means spaced from said motor means; a pair of relatively rotatable pulley assemblies mounted on said jackshaft means, each of said pair of pulley assemblies having a driven portion and a driving portion with said driven portions being in adjacent belt shifting position; first belt means selectively connectiing said motor means with the driven portion of one of said pulley assemblies; drive pulley means rotatively fixed to said container; first output means including second belt means having first and second legs drivingly connecting said drive pulley and the driving portion of a first of said pair of pulley assemblies for rotation of said rotatable container at a first speed; said first leg being the tight side and said second leg being the slack side of the second belt means during acceleration of said rotatable container toward said first speed; means mounting said jackshaft means to allow pivotal movement about a pivot axis radially spaced from said jackshaft means so that the moment arm of said belt tension in said first leg is relatively small and the moment arm of the belt tension in said second leg is relatively large; means pivotally biasing said jackshaft about said pivot axis to effect a first condition of driving tension on said second belt means for accelerating said rotatable container to said first speed; selectively operable means for shifting said first belt means between the driven portions of said pair of pulley assemblies; and second output means driven by a second of said pulley assemblies for rotation of said rotatable container at a speed higher than said first speed upon shifting of said first belt means into engagement with the second of said pulley assemblies, said jackshaft means being pivotally responsive to a shifting of said first belt means into re-engagement with said first pulley assembly upon interruption of operation of said rotatable container at said higher speed for effecting a second condition of tension on said second belt means to gradually decelerate said rotatable container from said second higher speed.

References Cited
UNITED STATES PATENTS

| | | | |
|---|---|---|---|
| 1,242,166 | 10/1917 | Fitzgerald | 74—242.9 |
| 2,942,447 | 6/1960 | Rickel et al. | 74—217 |
| 3,008,351 | 11/1961 | Smith | 74—217 |
| 3,101,625 | 8/1963 | Horvath | 74—472 |

DONLEY J. STOCKING, *Primary Examiner.*

H. S. LAYTON, *Assistant Examiner.*

UNITED STATES PATENT OFFICE
CERTIFICATE OF CORRECTION

Patent No. 3,339,423                                    September 5, 1967

Richard P. Bergeson

It is hereby certified that error appears in the above numbered patent requiring correction and that the said Letters Patent should read as corrected below.

Column 3, line 8, for "tube" read -- tub --; line 23, strike out "a"; column 9, in the second table, fourth column, line 1 thereof, for "154" read -- 3 --; same column 9, line 58, for "asesembly" read -- assembly --; column 10, line 65, after "respectively" insert a period; line 70, after "driven" insert -- at --; column 11, line 38, for "aunbalance" read -- unbalance --; column 12, line 39, for "meas" read -- means --; column 16, lines 9 and 36, for "container;", each occurrence, read -- container: --; line 69, for "connectiing" read -- connecting --; column 17, line 1, for "speed;" read -- speed, --.

Signed and sealed this 15th day of October 1968.

(SEAL)
Attest:

Edward M. Fletcher, Jr.                                EDWARD J. BRENNER
Attesting Officer                                            Commissioner of Patents